W. H. MORAN.
FUEL RESERVOIR.
APPLICATION FILED AUG. 19, 1911.

1,039,573.

Patented Sept. 24, 1912.

WITNESSES

INVENTOR
W. H. Moran
BY
Dull, Warfield & Dull
ATTORNEYS

UNITED STATES PATENT OFFICE.

WILLIAM H. MORAN, OF NEW YORK, N. Y.

FUEL-RESERVOIR.

1,039,573.  Specification of Letters Patent.  Patented Sept. 24, 1912.

Application filed August 19, 1911. Serial No. 645,034.

*To all whom it may concern:*

Be it known that I, WILLIAM H. MORAN, a citizen of the United States, residing at New York, in the county of New York and State of New York, have invented certain new and useful Improvements in Fuel-Reservoirs, of which the following is a full, clear, and exact description, such as will enable others skilled in the art to which it appertains to make and use the same.

This invention relates to devices for supplying and delivering liquids such as oil or other hydrocarbon fluids, and with respect to its more specific features, to oil reservoirs or tanks mounted on a vehicle, such as an automobile or boat, and adapted to supply oil to an engine on the vehicle, and more particularly to supply oil fuel to internal combustion engines.

One of the objects of the invention is the provision of an efficient device of the character referred to wherein the oil may be supplied to the internal combustion engine notwithstanding various positions which may be assumed by the reservoir.

Another object of the invention is the provision of a device of the character referred to, offering a simple and practical means for delivering substantially the entire contents of the reservoir to the engine.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

Figure 1:
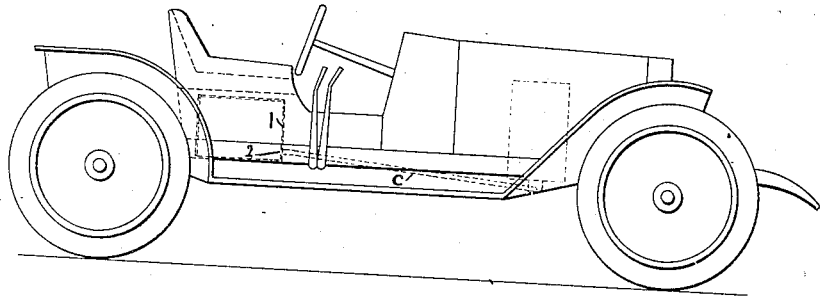
Figure 2:
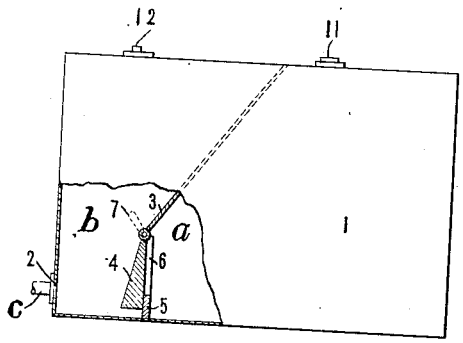
Figure 4:
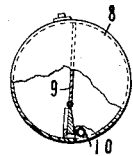
Figure 3:
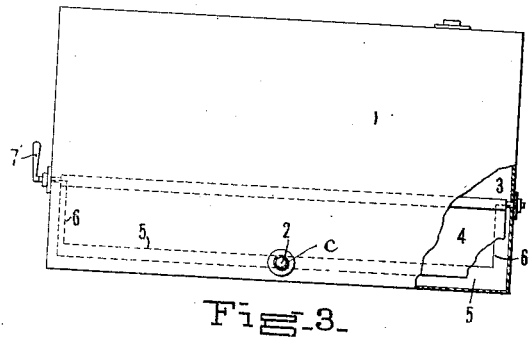

In the accompanying drawing, wherein is illustrated one of various possible embodiments of the invention, Figure 1 represents in elevation a vehicle or automobile showing the fuel reservoir in position beneath the seat; Fig. 2 is a side elevation of the fuel reservoir partly broken away to disclose the interior thereof; Fig. 3 is a front elevation of the reservoir also partly broken away to disclose the interior thereof; and Fig. 4 is a side view of a modified embodiment of the invention.

Similar reference characters refer to similar parts throughout the several views of the drawing.

Internal combustion engines employed as motors for automobiles, etc., are supplied with oil fuel from a tank or reservoir mounted at a suitable and convenient position on the vehicle. The reservoir is located at a point somewhat elevated with respect to the level of the entry of the oil into the carbureter or other suitable part of the engine, the oil being fed by gravity from the reservoir through a pipe to the engine. The oil is discharged from the reservoir at a point preferably slightly elevated above the bottom of the reservoir in order to prevent sediment from feeding to the engine, and as the vehicle travels the reservoir assumes various inclinations dependent upon the character of the road over which it progresses. When descending a hill, the oil in the reservoir gravitates toward the discharge opening and if the inclination be sufficiently great practically all of the oil in the reservoir will be fed to the engine. However, when the vehicle is ascending a hill the reverse operation occurs and the oil in the reservoir gravitates away from the outlet thereof. Consequently, when the supply of oil in the reservoir has been reduced, it often happens that when on a level, or when ascending a hill, there is such a small amount of oil in the reservoir that it does not enter the discharge opening, or the head of oil is so reduced that it is insufficient to feed oil to the engine on account of the too great inclination of the vehicle, and, consequently, the reservoir thereon. In order to avoid these and other objections, this invention provides for the feed of oil from the reservoir to the engine, which, to a degree, is independent of the inclination of the reservoir, thereby providing for the utilization of a greater amount of the contents of the reservoir than has heretofore been accomplished.

Referring now more particularly to the drawing, the character *a* indicates a main chamber adapted to contain a supply of oil to be used in the engine. The character *b* indicates a second or auxiliary chamber through which the oil in chamber *a* passes on its way to the engine, and *c* indicates a pipe to conduct the oil from the auxiliary chamber to the point where the oil is to be delivered. Although the chambers *a* and *b* may be arranged in any suitable manner capable of effecting the functions hereinafter described, in the interest of simplicity and compactness of parts it is preferred to arrange the chambers closely adjacent each other. Accordingly, a reservoir or tank 1 is provided, preferably of general rectangular construction, and in the present instance, located beneath the seat of the automobile or other vehicle supporting the engine to be supplied. The chambers *a* and *b*, above referred to, are embodied in the reservoir 1, the auxiliary chamber *b* having an outlet or discharge opening 2 through which the oil passes into the pipe *c* leading to the engine, which latter is located forward of the auxiliary chamber. A partition 3 extending from side to side of the reservoir divides the same into the rear main chamber *a* and the front auxiliary chamber *b*, above mentioned, said partition extending from the top of the reservoir toward the bottom, preferably on an incline, and terminating short of the bottom so as to provide a passageway through which the oil fuel may flow from one chamber to the other. In order to control the flow of oil between the chambers, an automatically operating valve is provided. While the valve may be of any suitable construction capable of accomplishing the results desired, it is preferred to provide a flap valve 4 pivotally supported in the walls of the reservoir, said valve being weighted, as by increasing its section toward the bottom, so that as the tank inclines the valve will readily automatically open and close. Projecting upwardly from the bottom of the tank and extending thereacross is a flange 5 having upwardly projecting portions 6, and the valve 4 is adapted to seat against the parts 5 and 6 and prevent flow of oil from the auxiliary chamber into the main chamber. Should it be desired to permit such flow, however, the valve may be opened by means of the handle 7 connected thereto and projecting outside the reservoir. It will be understood that the valve 4 is located so as to automatically leave its seat when the vehicle is descending an incline so that oil may flow from the main chamber into the auxiliary chamber. This latter chamber is of such a character as to cause the oil fed from the main chamber to assume a greater depth or to have a greater discharge head than would the same amount of oil in the main chamber. In the present embodiment, the auxiliary chamber is of less capacity than the main chamber, by reason of its reduced fore and aft dimension, and when the vehicle is descending an incline oil will flow from the main to the auxiliary chamber, rising in the latter to a sufficient height to discharge through the outlet 2 and the pipe *c*. When the vehicle assumes a level position, the valve 4 will automatically close, and the head of oil in the auxiliary chamber will be greater than it would have been had the oil been permitted to spread throughout the two chambers. And so when the vehicle ascends an incline, a greater head will be maintained in the auxiliary chamber than would have resulted had the same amount of oil been permitted to spread throughout the reservoir.

In the modified form illustrated in Fig. 4, the tank 8 is of generally cylindrical shape, the axis of the cylinder extending transversely of the vehicle when in position thereon. This tank is divided into a plurality of chambers by a partition 9, and a valve similar to the valve 4 is provided and is adapted to operate against a valve-seat similar to the construction described in connection with the embodiment shown in other figures. The discharge outlet 10 in the modified form is preferably located in the head of the tank.

The usual filling plug 11 is provided for introducing the oil into the tank, and in some instances, an auxiliary plug 12 is provided for permitting the entry of oil directly into the auxiliary chamber should, for any reason, the necessities of the case require it.

The operation of the device should be clear from the above description. Assuming the tank or reservoir to be full of oil, or other liquid fuel, the head thereof will be sufficient to supply the engine with oil at all times consistent with the ordinary inclinations met in traveling. The valve 4 is so hung as to rest lightly against its seat so that should the head of oil in the main chamber exceed that in the auxiliary chamber, oil will flow from the former to the latter. Thus, on level ground the contents of the reservoir will be delivered through the pipe *c* until the level of the oil is below the opening 2 leading to the pipe *c*. In descending an incline, the valve 4 will gravitate open, and oil will flow from the main chamber to the auxiliary chamber, and subsequent leveling of the vehicle, or a reverse inclination due to ascending an incline, will cause the valve to close and trap the oil in the auxiliary chamber. The auxiliary chamber is of such dimensions that the same amount of oil will assume a greater depth therein than in the main chamber, this being accomplished in the present embodiment by decreasing its fore and aft dimension while preserving the same width and height as that of the main reservoir. The head of oil in the auxiliary reservoir will, therefore, be increased over what the same amount would have if spread over the area of the entire reservoir, and thus despite the incline due to the hill, and despite the lowering of the oil level, a greater amount of oil may be delivered through the discharge opening than with the ordinary construction of tank. Thus, by the above-described construction is accomplished, among others, the objects hereinbefore stated.

Having described my invention, what I claim as new and desire to secure by Letters Patent is:

1. In an apparatus of the character described, in combination, a reservoir comprising a discharge opening, and automatic means whereby as the reservoir is tilted fluid will flow toward the discharge opening and provide a discharge head of liquid adjacent the opening greater than the head otherwise provided by the reservoir for the same amount of fluid.

2. In an apparatus of the character described, in combination, an oil reservoir comprising a main chamber, an auxiliary chamber having an outlet, and automatic means adapted to provide in the auxiliary chamber a greater head than the main chamber for the same amount of oil.

3. In an apparatus of the character described, in combination, an oil reservoir comprising a main chamber, an auxiliary chamber having an outlet, and automatic means adapted to provide in the auxiliary chamber a greater head than the main chamber for the same amount of oil, comprising a swinging valve adapted to permit the flow of oil from the main chamber to the auxiliary chamber and obstruct its return.

4. In an apparatus of the character described, in combination, an oil reservoir comprising a main chamber, an auxiliary chamber having an outlet, and automatic means adapted to provide in the auxiliary chamber a greater head than the main chamber for the same amount of oil, comprising a pivotal weighted valve adapted to permit the flow of oil from the main chamber to the auxiliary chamber and obstruct its return.

5. In an apparatus of the character described, in combination, a reservoir providing connected main and auxiliary chambers, automatic means whereby as the reservoir is tilted in one direction fluid will flow from the main to the auxiliary chamber, and a discharge head of liquid provided in the auxiliary chamber greater than the head in the main chamber.

6. In an apparatus of the character described, in combination, a tank, a partition dividing the tank into connected main and auxiliary chambers, the auxiliary chamber being of less capacity than the main chamber, a valve interposed in the connection between the main and auxiliary chambers and adapted to permit liquid to flow from the main to the auxiliary chamber and obstruct its return whereby, upon tilting the tank in the direction to cause flow of liquid from the main to the auxiliary chamber, a head of liquid will be obtained in the auxiliary chamber greater than the head in the main chamber.

7. In an apparatus of the character described, in combination, a tank, a partition dividing the tank into a plurality of chambers, a passageway connecting the chambers transversely of the partition, and means whereby upon tilting the tank so as to cause the flow of oil from one chamber to the other a discharge head of oil will be obtained in the chamber receiving the oil greater than the head of oil remaining in the other chamber.

8. In an apparatus of the character described, in combination, a tank, an inclined partition dividing the tank into connected main and auxiliary chambers, a valve interposed in the connection between the chambers and adapted to permit liquid to flow from the main to the auxiliary chamber and obstruct its return, whereby upon tilting the tank in the direction to cause flow of liquid from the main to the auxiliary chamber a head of liquid will be obtained in the auxiliary chamber greater than the head in the main chamber.

In testimony whereof I affix my signature, in the presence of two witnesses.

WILLIAM H. MORAN.

Witnesses:
J. W. ANDERSON,
L. A. WATSON.